(12) United States Patent
Hong et al.

(10) Patent No.: US 7,430,194 B2
(45) Date of Patent: Sep. 30, 2008

(54) METHOD AND APPARATUS FOR COMMUNICATION BETWEEN COORDINATOR-BASED WIRELESS NETWORKS CONNECTED THROUGH BACKBONE NETWORK

(75) Inventors: Jin-woo Hong, Suwon-si (KR); Dae-gyu Bae, Suwon-si (KR); Hyun-ah Sung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 284 days.

(21) Appl. No.: 11/096,063

(22) Filed: Apr. 1, 2005

(65) Prior Publication Data

US 2005/0220063 A1   Oct. 6, 2005

Related U.S. Application Data

(60) Provisional application No. 60/558,553, filed on Apr. 2, 2004.

(30) Foreign Application Priority Data

Apr. 21, 2004   (KR) ...................... 10-2004-0027459

(51) Int. Cl.
*H04Q 7/24* (2006.01)

(52) U.S. Cl. .................. 370/338; 370/310.2; 370/312; 370/320; 370/328; 370/348; 370/349; 370/389; 370/392; 370/395.5; 370/395.21; 370/449; 455/41.2; 455/574

(58) Field of Classification Search ................ 370/338, 370/310.2, 312, 328, 320, 348, 349, 351, 370/389, 395.21, 449, 392, 595.5, 395.5; 455/41.2, 574

See application file for complete search history.

(56) References Cited

U.S. PATENT DOCUMENTS

| 6,590,928 | B1 | 7/2003 | Haartsen |
|---|---|---|---|
| 6,879,574 | B2* | 4/2005 | Naghian et al. ............. 370/338 |
| 7,016,336 | B2* | 3/2006 | Sorensen ..................... 370/351 |
| 7,245,947 | B2* | 7/2007 | Salokannel et al. ......... 455/574 |
| 2003/0016636 | A1* | 1/2003 | Tari et al. .................... 370/328 |
| 2003/0142643 | A1* | 7/2003 | Yang et al. .................. 370/328 |
| 2003/0235175 | A1* | 12/2003 | Naghian et al. ............. 370/338 |
| 2004/0233855 | A1* | 11/2004 | Gutierrez et al. ............ 370/252 |
| 2005/0075084 | A1* | 4/2005 | Salokannel et al. ......... 455/126 |
| 2005/0152305 | A1* | 7/2005 | Ji et al. ........................ 370/328 |
| 2005/0221752 | A1* | 10/2005 | Jamieson et al. ............... 455/1 |
| 2006/0176850 | A1* | 8/2006 | Gan et al. .................... 370/329 |

FOREIGN PATENT DOCUMENTS

| JP | 2002-290412 A | 10/2002 |
|---|---|---|
| KR | 2003-0084555 A | 11/2003 |
| KR | 2003-0087746 A | 11/2003 |

\* cited by examiner

*Primary Examiner*—Matthew Anderson
*Assistant Examiner*—Shaima Q Aminzay
(74) *Attorney, Agent, or Firm*—Sughrue Mion, PLLC (57) ABSTRACT

A method and apparatus are provided for communication among many coordinator-based wireless networks connected together through a wired backbone network using wired/wireless connecting devices. According to the method and apparatus, communication is allowed between wireless devices belonging to different coordinator-based wireless networks through wired/wireless connecting devices using physical addresses, whose uniqueness is ensured across the whole network, instead of using ID information assigned by a PNC, as physical addresses of a destination network device and a source belonging to different coordinator-based wireless networks.

14 Claims, 12 Drawing Sheets

COORDINATOR-BASED AD-HOC
WIRELESS NETWORK

COORDINATOR-FREE AD-HOC
WIRELESS NETWORK

METHOD AND APPARATUS FOR COMMUNICATION BETWEEN COORDINATOR-BASED WIRELESS NETWORKS CONNECTED THROUGH BACKBONE NETWORK

CROSS-REFERENCE TO RELATED APPLICATIONS

This application claims priority from Korean Patent Application No. 10-2004-0027459 filed on Apr. 21, 2004 in the Korean Intellectual Property Office and U.S. Provisional Patent Application No. 60/558,553 filed on Apr. 2, 2004 in the United States Patent and Trademark Office, the entire disclosures of which are incorporated herein by reference.

BACKGROUND OF THE INVENTION

1. Field of the Invention

Apparatuses and methods consistent with the present invention relate to communication between coordinator-based wireless networks connected through a backbone network, and more particularly, to communication between coordinator-based wireless networks connected through a wired backbone network using wired/wireless relay apparatuses.

2. Description of the Related Art

With the advancement in communication and network technologies, a wired network environment using wired media such as coaxial or optical cables is evolving into a wireless one using wireless signals in various frequency bands. In line with the transition from wired to wireless technology, a computing device that contains a wireless interface module, enables mobility, and perform specific functions by processing various information (hereinafter "a wireless network device") is being developed and wireless technologies that enable effective communication between wireless devices on a wireless network are emerging.

There are two major architectures of wireless networks: infrastructure and ad-hoc networks.

Figure 1:
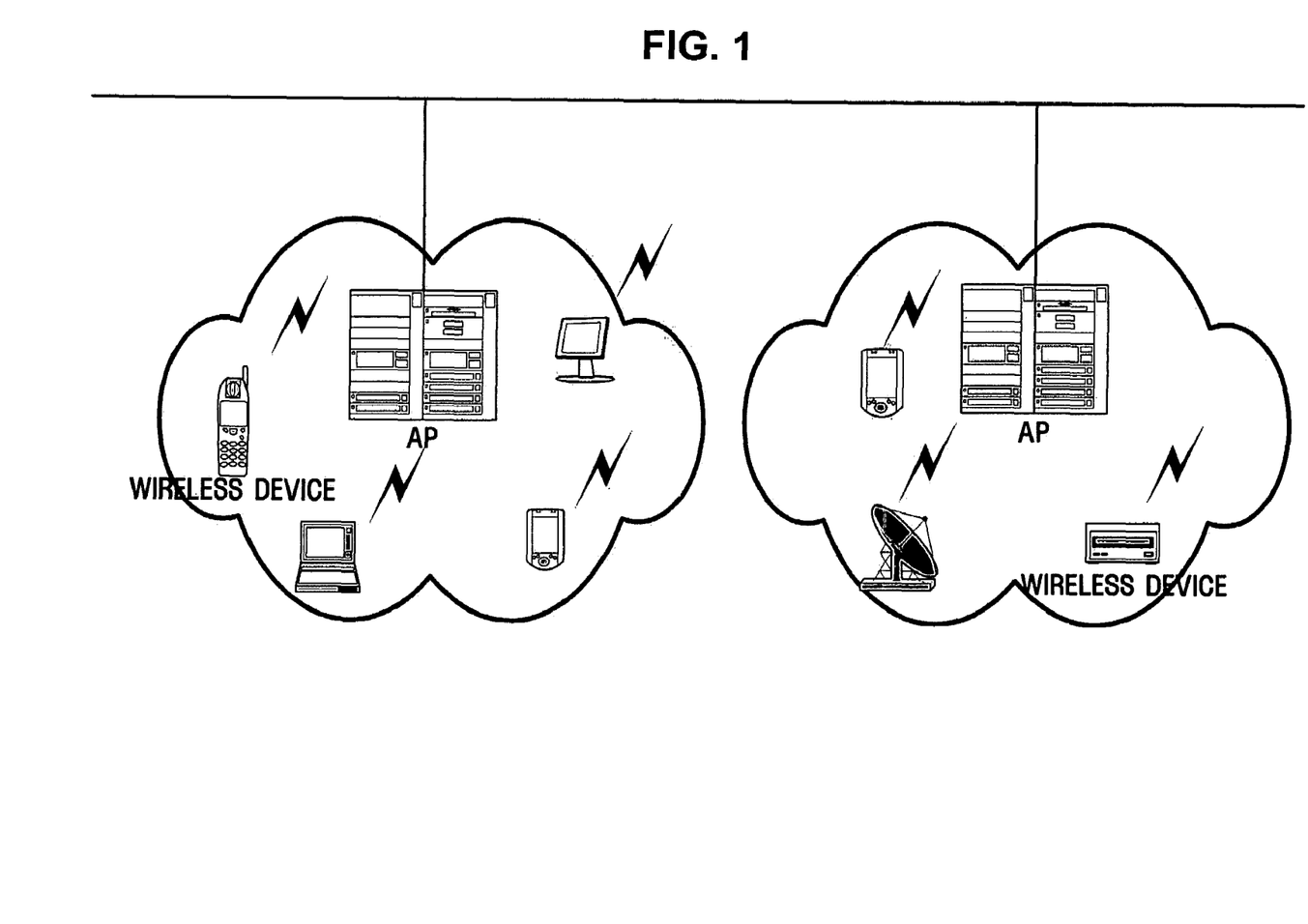
FIG. 1 is a diagram of a wireless network operating in an infrastructure mode.
Figure 2:
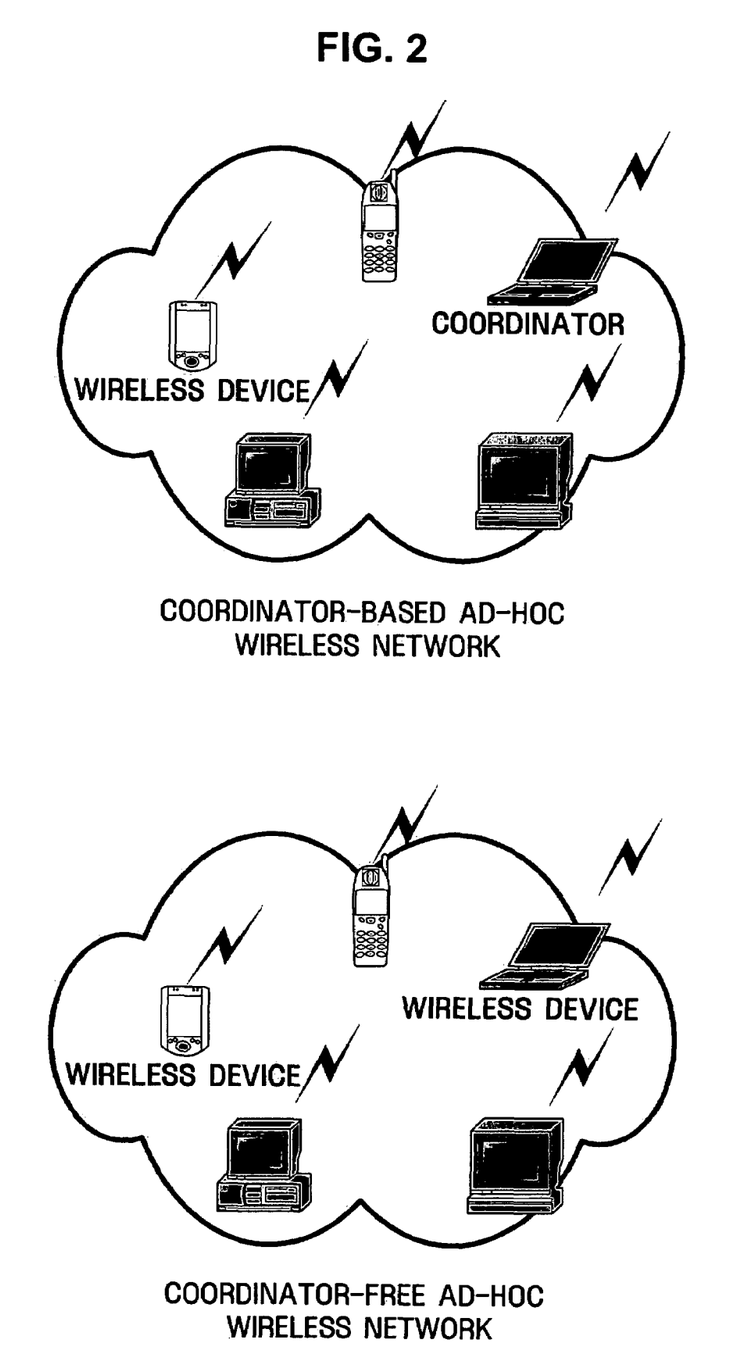
FIG. 2 is a diagram of a wireless network operating in an ad-hoc mode.

The infrastructure network contains an access point (AP) as shown in FIG. 1 whereas the ad-hoc network requires no AP for communication as shown in FIG. 2.

In an infrastructure mode, an AP not only has connectivity to the wired network but also provides communication among wireless network devices within a wireless network. Thus, all data traffic in the infrastructure network is relayed through the AP.

In an ad-hoc mode, wireless network devices within a single wireless network can directly communicate with one another without using an AP.

Such ad-hoc wireless networks can be further classified into two types based on the presence of a coordinator. In one type of network, which is called a coordinator-based wireless network, a randomly selected wireless device acts as a coordinator that assigns channel time to other wireless devices within the same wireless network for data transmission, and then the other wireless devices are allowed to transmit data only at the assigned time. As compared to the coordinator-based wireless network, the other type of network, which is called a coordinator-free wireless network, allows all network devices to transmit data at any time desired without using a coordinator.

The coordinator-based wireless network is a single independent coordinator-centered network. When there are multiple coordinator-based wireless networks within a certain area, each network has a unique ID to distinguish itself from others.

Thus, while wireless devices can transmit data to and/or receive data from other network devices during channel time assigned by the coordinator on a coordinator-based network where they belong, they are not allowed to communicate with wireless devices belonging to another coordinator-based network.

Figure 3:
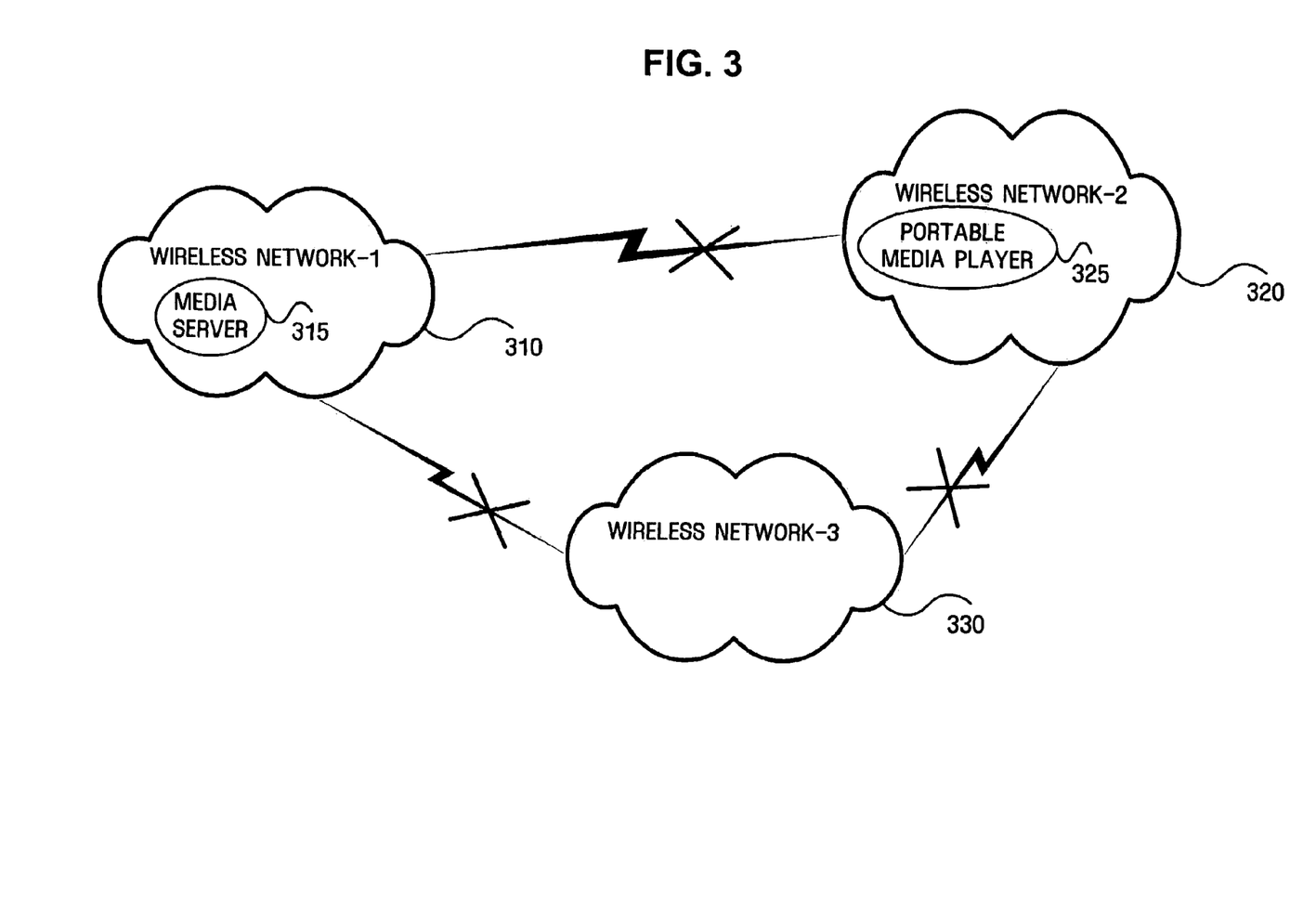
FIG. 3 is a diagram of a home networking system containing a plurality of coordinator-based wireless networks.

For example, in a home network system containing three coordinator-based wireless networks as shown in FIG. 3, it is assumed that a wireless network-1 310, a wireless network-2 320, and a wireless network-3 330 are built in a first-floor living room, a second-floor schoolroom, and a first-floor bedroom, respectively.

If a user desires to watch movies stored on a media server 315 in the living room using a portable moving picture player 325 in the schoolroom, then the user cannot watch movies since there is no way to communicate between the wireless network-1 310 and the wireless network-2 320. Thus, to see the movies, the user has to go downstairs to the living room.

This problem may arise due to restriction on range of radio waves, absence of information on another coordinator-based wireless network, and channel time allocation.

Thus, there is a need to construct a new network topology for data transmission and reception between wireless devices belonging to different coordinator-based wireless networks.

SUMMARY OF THE INVENTION

The present invention provides a method and apparatus for data transmission and reception between devices belonging to different coordinator-based wireless networks by connecting a plurality of different coordinator-based wireless networks together through a wired backbone.

According to an aspect of the present invention, there is provided a method for communication between coordinator-based wireless networks connected together through a backbone network, the method comprising acquiring a physical address of a destination network device belonging to a first coordinator-based wireless network, generating a frame containing the physical address of the destination network device, and transmitting the frame to a connecting device connecting a second coordinator-based wireless network containing a source device with the backbone network.

According to another aspect of the present invention, there is provided a method for communication between coordinator-based wireless networks connected together through a backbone network, the method comprising transforming a frame received from a network device into a frame in a format supported by the backbone network, sending the transformed frame to the backbone network, transforming the frame received from the backbone network into a frame in a format supported by a coordinator-based wireless network, and sending the transformed frame to a network device within the coordinator-based wireless network.

According to still another aspect of the present invention, there is provided a network device comprising a control module generating a physical address request frame requesting a physical address of a destination network device connected to a different coordinator-based wireless network than a coordinator-based wireless network to which a source network device belongs, extracting the physical address of the destination network device from a physical address response frame received in response to the physical address request frame, and generating a frame containing the physical address of the destination network device, a transceiver module transmitting the physical address request frame generated by the control module or the frame containing the physical address of the destination network device and receiving the physical address response frame in response to the physical address request frame, and a storage module storing the frames generated by the control module or received from the transceiver module.

According to a further aspect of the present invention, there is provided a network device comprising a control module generating a physical address response frame containing a physical address of a destination network device in response to a physical address request frame received from a connecting device connecting a backbone network with a coordinator-based wireless network to which the destination network device belongs, a transceiver module transmitting the physical address response frame generated by the control module and receiving the physical address request frame or the frame containing the physical address of the destination network device, and a storage module storing the frames generated by the control module or received from the transceiver module.

According to a yet another aspect of the present invention, there is provided a connecting device connecting a coordinator-based wireless network with a backbone network, the connecting device comprising a transceiver module transmitting a frame received from the coordinator-based wireless network to the backbone network and transmitting a frame received from the backbone network to the coordinator-based wireless network, a control module transforming the frame of the coordinator-based wireless network, the frame received from the transceiver module, into a frame in a format supported by the backbone network and transforming the frame of the backbone network, the frame received from the transceiver module, into a frame in a format supported by the coordinator-based wireless network, and a storage module storing the frames received from the transceiver module or transformed by the control module.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of this invention are shown.

The Institute of Electrical and Electronics Engineers (IEEE) 802.15.3 standard provides specifications for a Physical (PHY) layer corresponding to a Physical Layer of the seven layers of the Open System Interconnection (OSI) network model developed by the International Organization for Standardization (ISO) for wireless networks and a Medium Access Control (MAC) layer corresponding to a Data-link Layer.

For a better understanding of the present invention, a wireless personal area network (WPAN) compliant with the IEEE 802.15.3 standard, and more particularly, a network system for enabling data communication between wireless network devices belonging to different WPANs by connecting multiple WPANs via a wired backbone based on an MAC layer will now be described as an exemplary embodiment of a coordinator-based wireless network.

Figure 4:
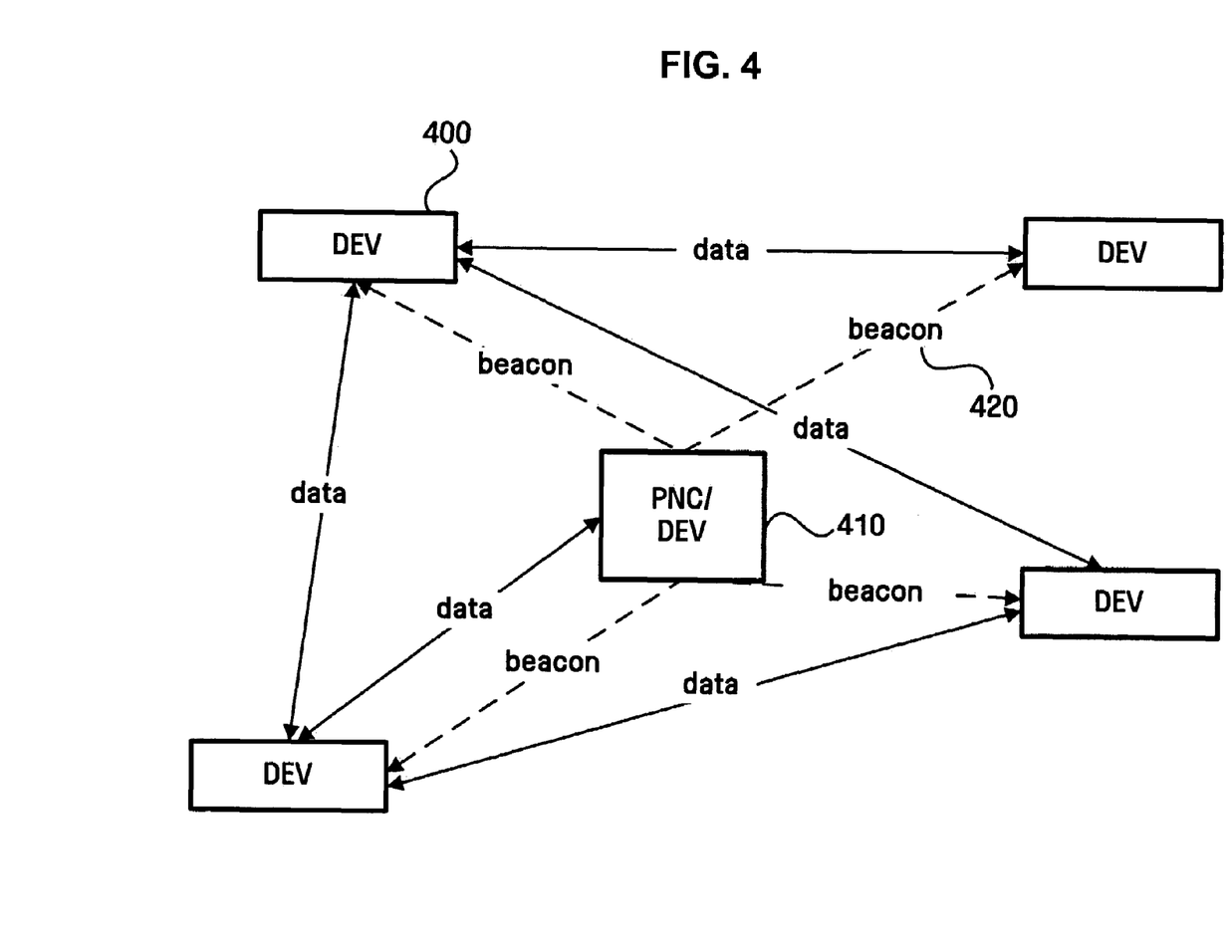
FIG. 4 shows the general structure of a Wireless Personal Area Network (WPAN) defined in the IEEE 802.15.3 standard specification.

FIG. 4 shows the general structure of a Wireless Personal Area Network (WPAN) defined in the IEEE 802.15.3 standard specification.

Ultra wideband (UWB) also known as digital pulse wireless is a wireless communications technology for transmitting large amounts of digital data over a wide spectrum of frequency bands at very low power for a short distance. The technology was developed by the U.S. Department of Defense for military purposes. The IEEE 802.15.3 Working Group for WPANs is developing a standard for UWB communications. While the IEEE 802.15.3 standard specifies PHY and MAC layers, industry research efforts are focusing more on improvement of the MAC layer.

The IEEE 802.15.3 MAC layer has the ability to join an existing wireless network rapidly. The MAC is also based on the concept of an ad-hoc network called a "piconet" controlled by a Piconet Coordinator (PNC) instead of an AP.

A piconet is a wireless ad-hoc data communication system that allows many independent data devices (DEVs) to communicate with each other. The piconet differs from other types of data networks in that data communications are normally confined tot a small area around person or object that typically covers about 10 meters in all directions and encompasses person or object whether stationary or in motion.

Referring to FIG. 4, a piconet defined in the 802.15.3 standard specification consists of a plurality of DEVs 400, one of which is elected as a PNC 410. The PNC 410 provides the basic timing for the piconet using a beacon frame 420 containing information about the piconet. The PNC 410 also manages quality of service (QoS) requirements, power save modes, and access control to the piconet.

A piconet is formed when an IEEE 802.15.3 compliant DEV capable of acting as a PNC begins transmitting a beacon frame. The PNC sending a beacon frame is deemed as a piconet if there are no other participants.

To transmit data, each DEV in the piconet requests channel time allocation (CTA) from the PNC. The PNC allocates channel time for a requesting device and broadcasts the CTA information to all DEVs in addition to a beacon frame. The DEVs receiving the beacon frames with the CTA information transmit stored data frames to destination DEVs during their assigned time slots.

For consistency of terms used, terms defined in WPAN are hereinafter used throughout this specification.

Figure 5:
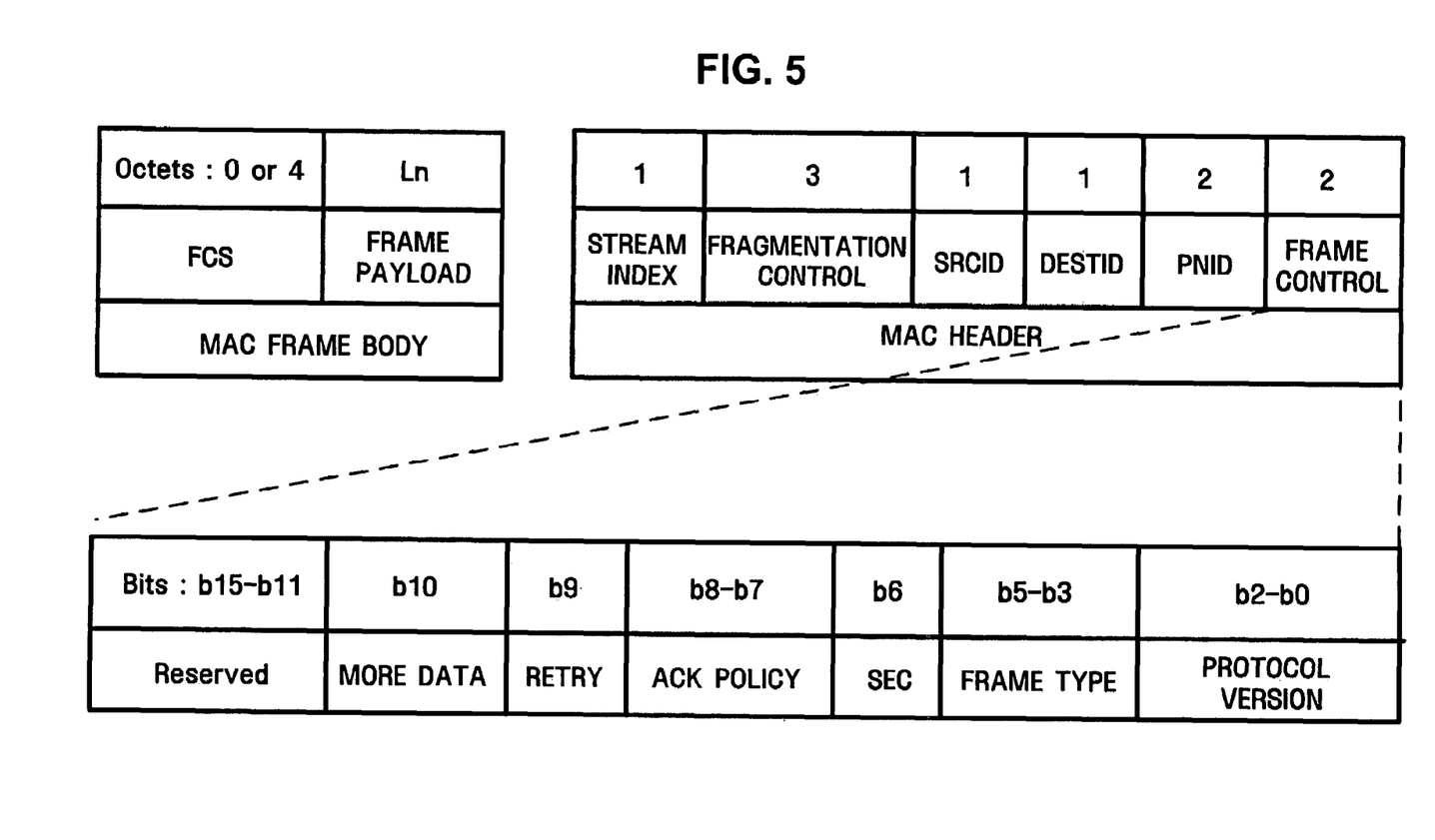
FIG. 5 shows a general frame in a format defined in the IEEE 802.15.3 standard specification.

FIG. 5 shows a general MAC frame in a format defined in the IEEE 802.15.3 standard specification.

Referring to FIG. 5, the MAC frame format consists of a set of fields that occur in a fixed order in all frames. Each MAC frame is basically composed of an MAC header, and an MAC frame body containing a variable length frame payload and a frame check sequence (FCS).

A frame control field in the MAC header is broken down into several subfields: protocol version, frame type, SEC, ACK policy, retry, more data, and reserved. The protocol version field specifies information about a protocol version of the IEEE 802.15.3 standard. A device that receives a frame having a higher protocol version that it supports may discard the frame without indication to a source device.

The frame type field identifies the type of a frame being transmitted. The following table defines frame type values and their description.

| Type value b5 b4 b3 | Description |
| --- | --- |
| 000 | Beacon frame |
| 001 | Immediate ACK frame |
| 010 | Delayed ACK frame |
| 011 | Command frame |
| 100 | Data frame |
| 101-111 | Reserved |

The SEC bit is set to 1 if the frame body field is secured with a key specified by a security ID (SECID) while it is set to 0 if not. Frames with a SEC bit set to 1 use the security field. The ACK policy field is used to indicate the type of acknowledgement procedure that the recipient is required to perform. The retry bit is set to 1 in any data or command frame that is a retransmission of an earlier frame while it is set to 0 in all other frames. The more data bit is set to 0 in the last frame in an extended beacon frame or frames that are not a part of the extended beacon frame. The more data bit is set to 1 in all other frames including frames that is a part of an extended beacon frame (excluding the last frame)

A piconet ID (PNID) field has a unique identifier for a piconet. The PNID remains constant during the current instantiation of the piconet and may be persistent for multiple sequential instantiations of the piconet by the same PNC. The PNID field is set to the current PNID for the piconet and used to identify frames in a piconet device.

The MAC frame format contains two device ID fields used to indicate source device ID (SrcID) and destination device ID (DestID). The device ID is unique to a device associated with a piconet. In the IEEE 802.15.3 standard specification, a one-byte device ID allocated by a PNC is used as a physical address of a device instead of an eight-byte MAC address in order to reduce frame overhead.

Here, a physical address is a hardware address that uniquely identifies each network device on a network. That is, the physical address of each network device is unique across the entire network. For an IEEE 802.15.3 complaint WPAN, an MAC address of each device is the same as its physical address.

In contrast to the physical address, a logical address of a device is necessary for providing universal communication services regardless of its underlying physical network. Since in a network environment where each network has a different address format, it is not proper to use a physical address of a network device, a universal address system is needed to uniquely identify each network device regardless of its physical location. An Internet Protocol (IP) address is an example of this logical address.

A fragmentation control field is used to divide an MAC service data unit (MASDU) or command frame into fragments and reassemble the fragments appropriately.

The frame payload field in the frame body includes a variable length field containing information being transmitted to a device or a group of devices in the piconet. The FCS field contains a 32-bit cyclic redundancy code (CRC).

Figure 6:
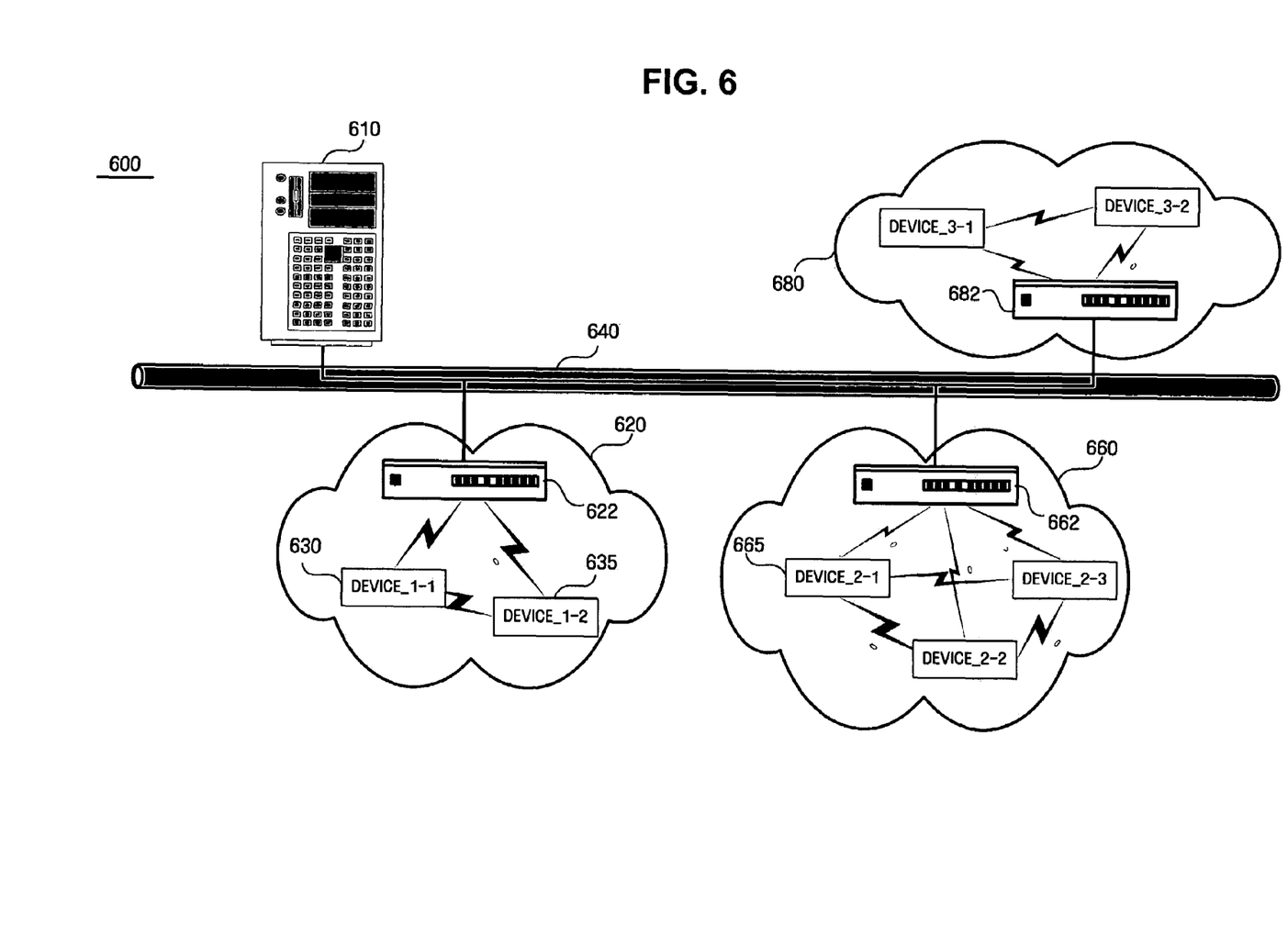
FIG. 6 shows a method for communication between WPANs connected together through a backbone network using wired/wireless connecting devices according to an exemplary embodiment of the present invention.

FIG. 6 shows a method for communication between WPANs connected together through a backbone network using wired/wireless connecting devices according to an exemplary embodiment of the present invention.

Referring to FIG. 6, a network system 600 is comprised of multiple piconets 620, 660, and 680, a wired network 640 connected to the piconets 620, 660, and 680, and connecting devices 622, 662, and 682 that connect the piconets 620, 660, and 680 with the wired network 640, respectively. In this case, for clear distinction, the piconets 620, 660, and 680 are hereinafter called first, second, and third piconets 620, 660, and 680, respectively.

Further, to more clearly distinguish the connecting devices 622, 662, and 682 belonging to the first through third piconets 620, 660, and 680, they are hereinafter referred to as first, second, and third connecting devices 622, 662, and 682, respectively. Each of the first through third connecting devices 622, 662, and 682 may include a router, a wired/wireless bridge, a device, or a PNC depending on the type of a network topology. For example, when each of the connecting devices 622, 662, and 682 is a wired/wireless bridge, the network system 600 may create an IP subnet such as '192.168.9.x', and each of the first through third piconets 620, 660, and 680 can be identified by its own ID. In the exemplary embodiments of the present invention, connecting devices of wired/wireless networks will be explained using wired/wireless bridges.

Meanwhile, the wired network 640 can conform to any wired network protocol based on a communication medium such as coax cable, optical cable, power line, or phone line. The protocol for the wired network 640 may vary depending on a physical environment where the present invention is applied.

According to an exemplary embodiment of the present invention, when a device_1-1 630 desires to communicate with a device_1-2 635, i.e., a communication is made with the same piconet, it has only to comply with a conventional IEEE 802.15.3 standard. However, when the device_1-1 630 wishes to communicate with a device_2-1 665 belonging to the second piconet 660, the first connecting device 622 initially receives a wireless packet transmitted by the device_1-1 630 and then generates a wired packet with a structure that is capable of transmitting information contained in the wireless packet. This is because a change in the structure of a communication protocol due to the characteristics of a transmission medium may also cause the structure of a packet to change. The wired packet generated by the first connecting device 622 is forwarded to the second connecting device 662 through the wired network 640. In this case, the first connecting device 622 may broadcast or multicast the wired packet to the second connecting device 662 or directly transmit the same only to the second connecting device 662.

The second connecting device 662 then converts the wired packet received from the first connecting device 622 back into the form of a wireless packet compliant with the IEEE 802.15.3 standard, allocates channel time defined in the same standard, and forwards the wireless packet to the device_2-1 665.

A response to the packet transmitted by the device_1-1 630 can be performed between the device_1-1 630 and the first connecting device 622, the first connecting device 622 and the second connecting device 662, the second connecting device 662 and the device_2-1 665, or between the device_1-1 630 and the device_2-1 665.

To reduce frame overhead, a device in a WPAN uses a device ID uniquely assigned by a PNC during association of the device instead of an MAC address as its physical address. The uniqueness of the device ID is insured within a single WPAN but may be not guaranteed within a subnet consisting of many WPANs connected through a backbone network using wired/wireless connecting devices as shown in FIG. 6. The same phenomenon may occur in all coordinator-based wireless networks in which a different format of address is allocated by a PNC as a physical address of a device instead of an MAC address whose uniqueness is guaranteed across the whole network. The phenomenon caused by duplication of device ID will now be described with reference to FIG. 7.

Various protocols may be implemented over a coordinator-based wireless network. Assuming that an IP layer is used on a WPAN, an example of use of duplicate device ID within a subnet will now be described.

Figure 7:
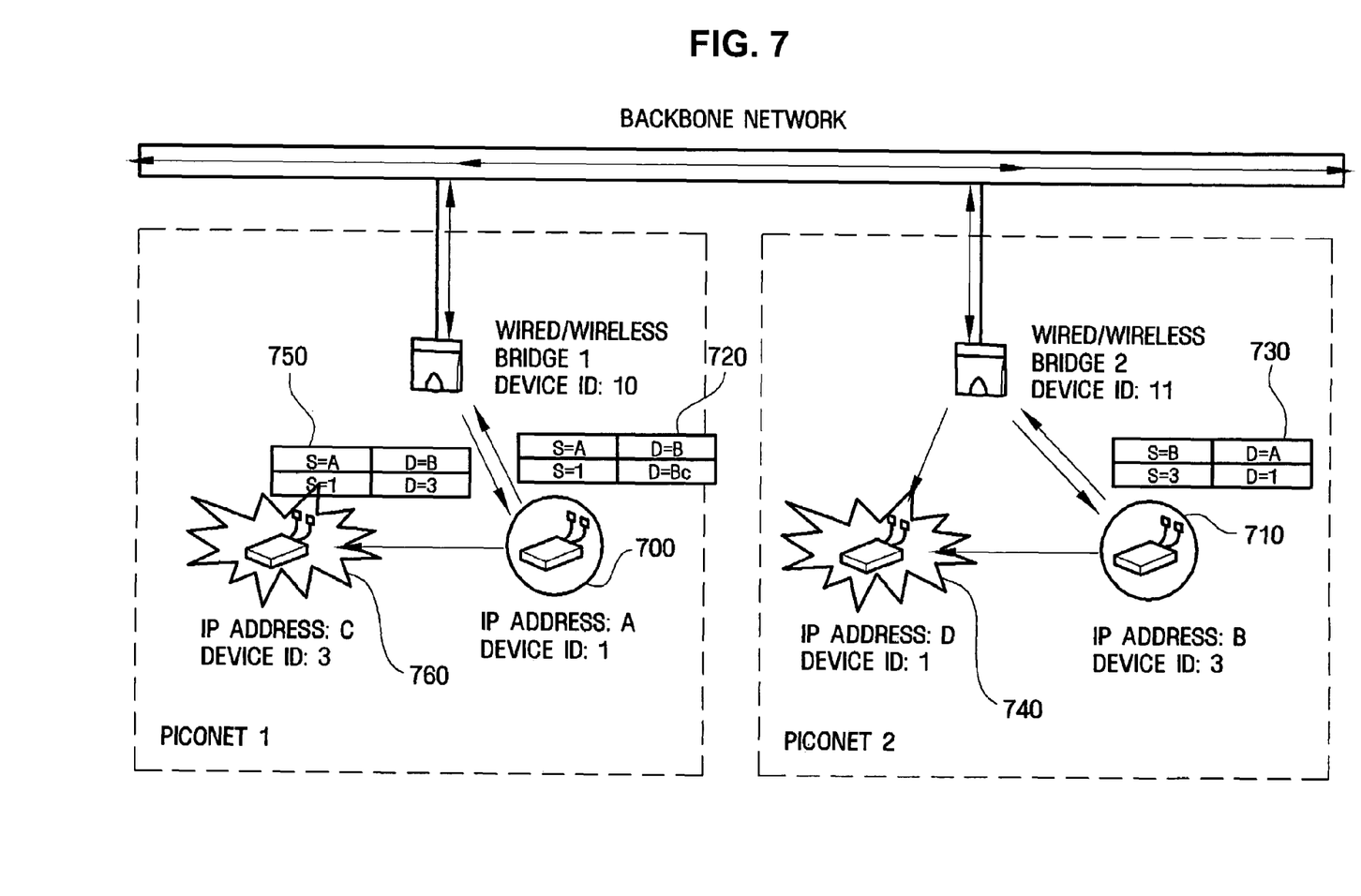
FIG. 7 shows failure in frame transmission caused by duplicate device ID within a subnet during communication between WPANs connected through a backbone network.

When a device 700 in a piconet 1 that has been assigned an IP address A ('device A') transmits data to a device 710 in a different WPAN, i.e., piconet 2, which has been assigned an IP address B (device B), since the device A is aware of only the IP address of the device B, it broadcasts an Address Resolution Protocol (ARP) request frame 720 requesting a physical address corresponding to the IP address. The device B in the piconet 2 that receives the broadcast frame sends an ARP response frame 730 containing its device ID 3 as the physical address back to the device A with device ID 1. In this case, however, an unexpected frame error may occur since the ARP response frame 730 may also be transmitted to a device D 740 with the same device ID as the device A but in the piconet 2.

On the other hand, the device A that acquires the device B's ID from the ARP response frame 730 may also forward a data frame 750 containing its own device ID 1 and device B's ID 3 as a physical address to a device C 760 in the piconet 1 having the same device ID as the device B, which leads to an unexpected failure in frame transmission.

This transmission failure may occur due to the use of a one-byte device ID assigned by a PNC as a physical address of a device instead of an address such as an eight-byte MAC address whose uniqueness is guaranteed across the whole network. That is, transmission of an incorrect frame may occur since two or more different devices have the same device ID. The uniqueness of a device ID is not guaranteed within a subnet composed of a plurality of piconets connected together via a backbone using wired/wireless bridges although a device ID is unique to the same piconet. Thus, one way of solving this problem is to use an address such as an eight-byte MAC address whose uniqueness is guaranteed across the whole network as a physical address of a device in the case of data transmission between devices within different piconets.

Figure 8:
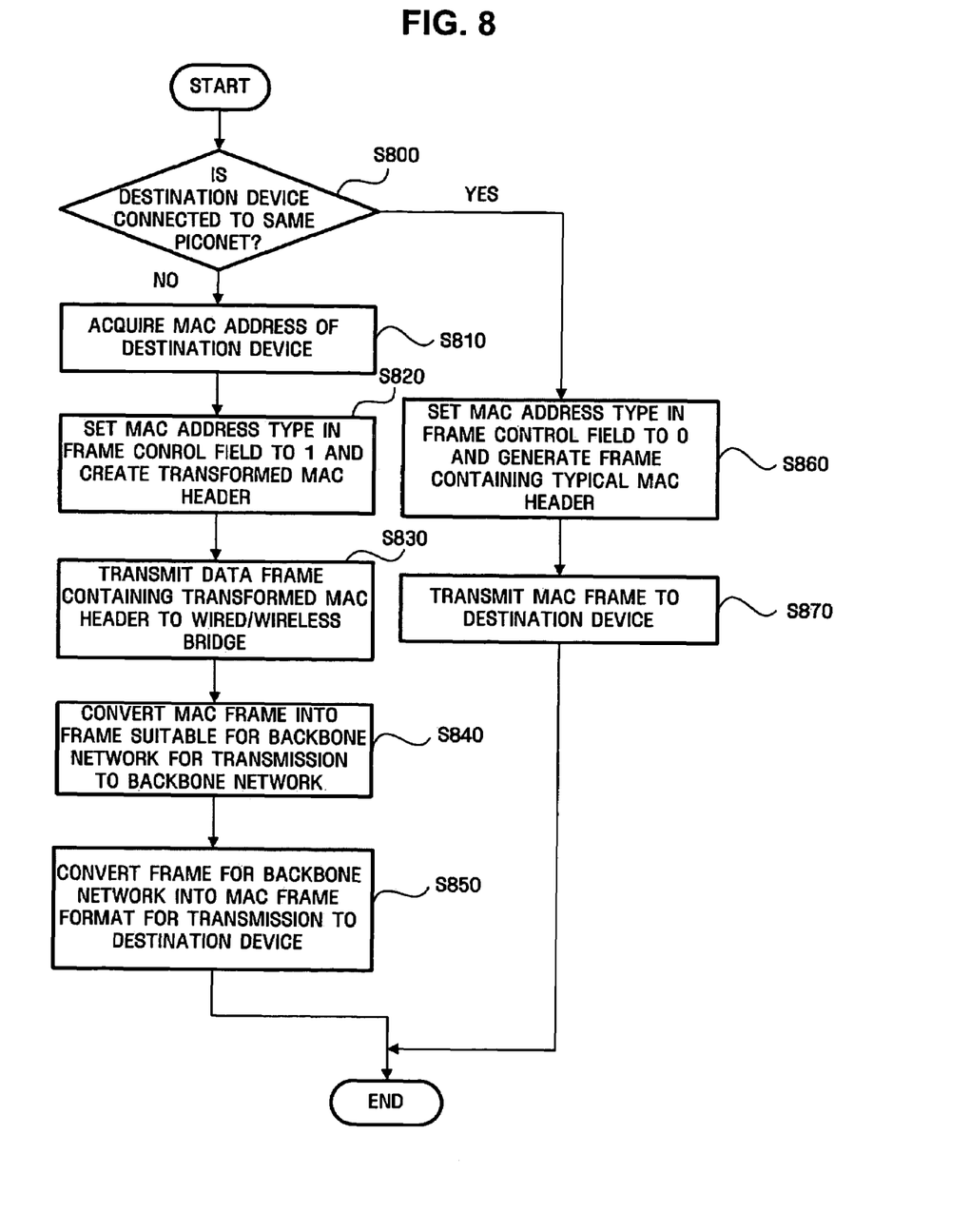
FIG. 8 is a flowchart illustrating a method for performing communication between WPANs connected through a backbone network using a Medium Access Control (MAC) address of a device according to an exemplary embodiment of the present invention.

FIG. 8 is a is a flowchart illustrating a method for performing communication between WPANs connected through a backbone network using an MAC address of a device according to an exemplary embodiment of the present invention.

Referring to FIG. 8, in operation S800, a source device checks with a PNC (PNC1) whether a destination device is connected to the same piconet (piconet 1). In operation S860, when the destination device is within the piconet 1, the source device sets an MAC address type (910 of FIG. 9A) in a frame control field to 0 and generates a frame with an MAC header that complies with the conventional 802.15.3 frame format shown in FIG. 5. In operation S870, the source device forwards the MAC frame to the destination device during a channel time assigned by the PNC1.

Conversely, when the destination device is not within the same piconet, i.e., when it is within a piconet 2, the source device acquires an MAC address of the destination device in operation S810 and, in operation S820, sets an MAC address type in the frame control field to 1 and generates an MAC header of a transformed format containing a source device MAC address and a destination device MAC address as a physical address of a device instead of a source device ID and a destination device ID. In operation S830, the source device transmits an MAC frame containing the transformed MAC header to a wired/wireless bridge during channel time assigned by the PNC1. The details of a transformed MAC frame format will be described later with reference to FIGS. 9A and 9B. The MAC address type values may be changed inversely or to any values that can distinguish between the two types.

Meanwhile, the operation S810 may be broken down into the following operations. An ARP mechanism may be used as a mechanism for acquiring the MAC address of the destination device.

Specifically, the source device broadcasts an ARP request frame containing its physical and IP addresses and an IP address of the destination device. In this case, a physical address space of the destination device in the ARP request frame is empty or filled with zeros. The destination device connected to the piconet 2, which receives the broadcast ARP request frame, recognizes the IP address as its own and sends an ARP response frame containing its own physical address back to the source device in the piconet 1. The source device acquires the MAC address of the destination device from the ARP response frame received from the destination device.

In operation S840, a wired/wireless bridge that receives the MAC frame from the source device converts the frame complying with the conventional 802.15.3 frame format into a frame format supported by a backbone network protocol and transmits the same to the wired backbone network.

In operation S850, a wired/wireless bridge in the piconet 2 on the receiver side transforms the frame received from the backbone network into a frame in a format supported by the IEEE 802.15.3 standard and transmits the transformed frame to the destination device.

In this case, channel time needs to be allocated for frame transmission in the piconet 2. Since the IEEE 802.15.3 standard dictates that only a source device transmitting data is allowed to request channel time allocation (CTA), a mechanism for performing CTA for data reception is needed when the destination device that desires to receive data belongs to a different network than the source device.

This mechanism may be performed to allow the destination device to request CTA by attaching a parameter indicating whether a device requesting CTA is the source device or the destination device to a message invoked upon receipt of the request for CTA. In this case, before requesting the CTA, the destination device receives various kinds of information needed for CTA from a middleware or application operating at a layer overlying an MAC layer.

While it has been described above that the ARP mechanism is performed at an IP layer to acquire the physical address of the destination device, it is readily apparent to one skilled in the art that various other mechanisms using a frame requesting a physical address of a destination device and a response frame containing the physical address of the destination device may be applied for the same purpose. Furthermore, while it has been described above that a physical address of a device is an MAC address, the format of a physical address may vary depending on the physical environment of a network.

Figure 9A:
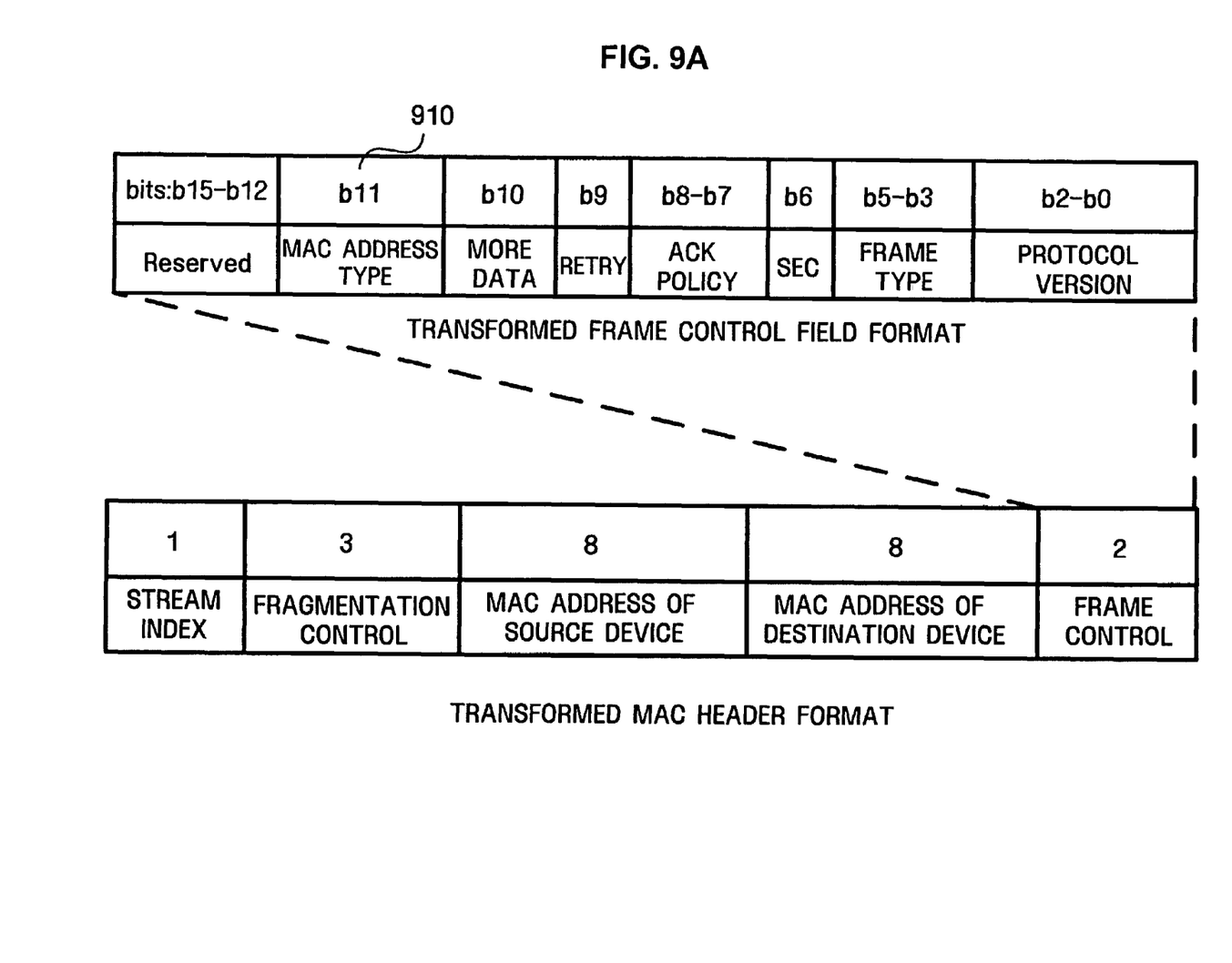
FIGS. 9A and 9B show formats of transformed frames containing an MAC address as a physical address of a device according to an exemplary embodiment of the present invention.
Figure 9B:
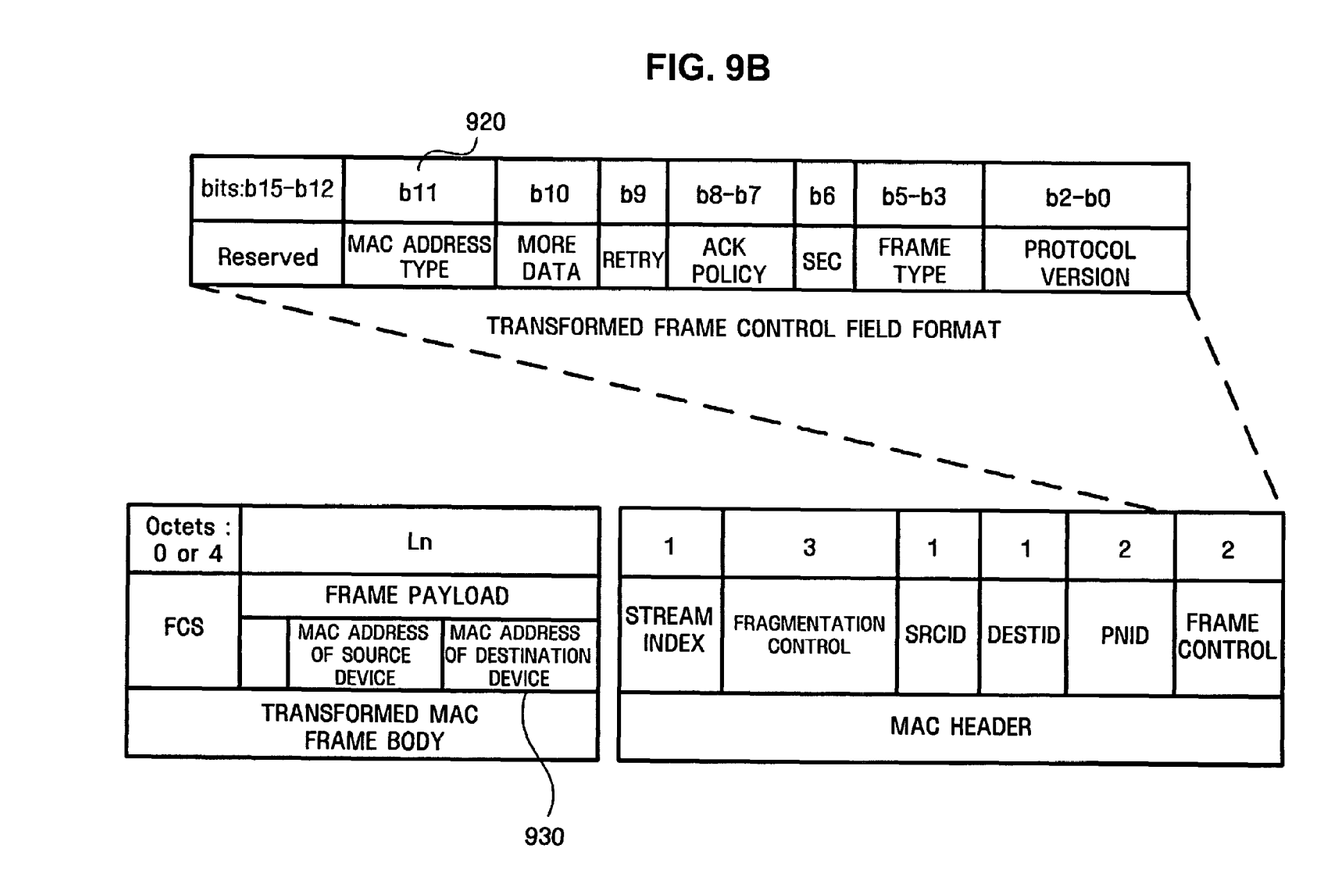

FIGS. 9A and 9B show formats of transformed frames according to exemplary embodiments of the present invention, each containing an MAC address as a physical address of a device.

It is difficult to implement such a communication mechanism as shown in FIG. 8 using a frame in a format complaint with the IEEE 802.15.3 standard. Thus, to realize the present invention, the conventional frame format needs to be modified. The extent of modifications to the frame format may vary according to the type of the first through third connecting devices 622, 662, and 682. Thus, the present invention proposes a new frame format when the first through third connecting devices 622, 662, and 682 are a wired/wireless bridge.

Referring to FIG. 9A, one reserved bit 910 in a frame control field contained in an MAC header specifies an MAC address type. When a destination device belongs to a different piconet from a source device, an MAC address type value is set to 1, while when the destination device and the source device belong to the same piconet, the MAC address type value is set to 0. The destination network type values may be changed inversely or to any values that can distinguish between the two different network types.

When the MAC address type value is 0, the conventional IEEE 802.15.3 frame format shown in FIG. 5 is used as it is. However, when the MAC address type value is 1, a modified frame format is used that includes an MAC header containing MAC addresses of the source network device and the destination network device instead of a source device ID and a destination device ID.

FIG. 9B shows a new frame format according to another exemplary embodiment of the present invention. Referring to FIG. 9B, a payload field contained in a frame body includes MAC addresses of a source network device and a destination network device created by transforming a source device ID and a destination device ID into a format supported by a destination network. The present exemplary embodiment is the same as the previous exemplary embodiment shown in FIG. 9A in that one reserved bit 920 in a frame control field contained in the MAC header is used. However, the difference lies in that the MAC addresses of the source and destination network devices are included as a part of data 930 in the payload field instead of inserting them in an MAC header.

Each of destination devices with duplicate ID receives a frame containing the same destination device ID in an MAC header as its own ID. When an MAC address type 920 in a frame control field is set to 1, the destination device checks whether a destination device MAC address in a payload field contained in a frame body coincides with its MAC address. If both coincide with each other, the destination device handles the frame, but if not, discards it.

Figure 10:
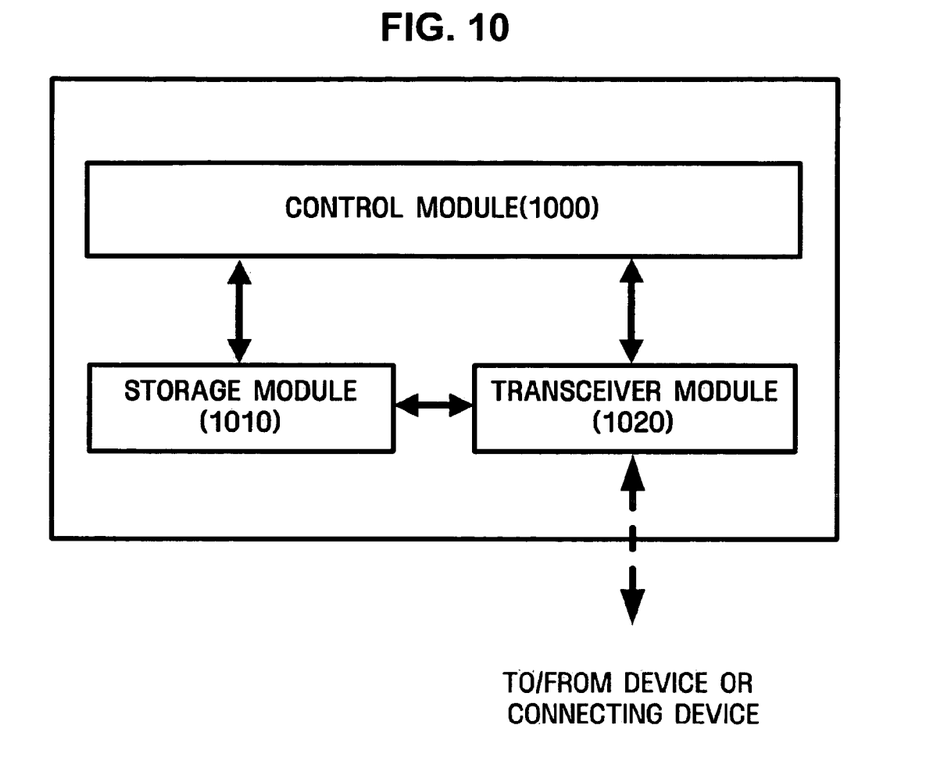
FIG. 10 is a block diagram of a wireless device according to an exemplary embodiment of the present invention.

FIG. 10 is a block diagram of a network device according to an exemplary embodiment of the present invention.

Referring to FIG. 10, the network device mainly includes a control module 1000, a storage module 1010, and a transceiver module 1020.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they play one or more central processing units (CPUs) in a device.

When a destination network device belongs to a different type of network than a coordinator-based wireless network containing a source network device, the control module 1000 in the source network device generates a physical address request frame requesting a physical address of the destination network device and extracts the physical address of the destination network device from a physical address response frame returned by the destination network device.

The control module 1000 in the destination network device generates a physical address response frame containing its own physical address in response to the physical address request frame received from a connecting device connecting a coordinator-based wireless network containing itself with a backbone network and extracts its own physical address from the frame containing the physical address.

The transceiver module 1020 sends the physical address request frame generated by the control module 1000 or a frame containing the physical address of the destination network device and receives a physical address response frame in response to the physical address request frame.

The transceiver module 1020 transmits a physical address response frame generated by the control module 1000 and receives a physical address request frame or a frame containing its own physical address.

The storage module 1010 stores frames generated by the control module 1000 or received from the transceiver module 1020.

Figure 11:
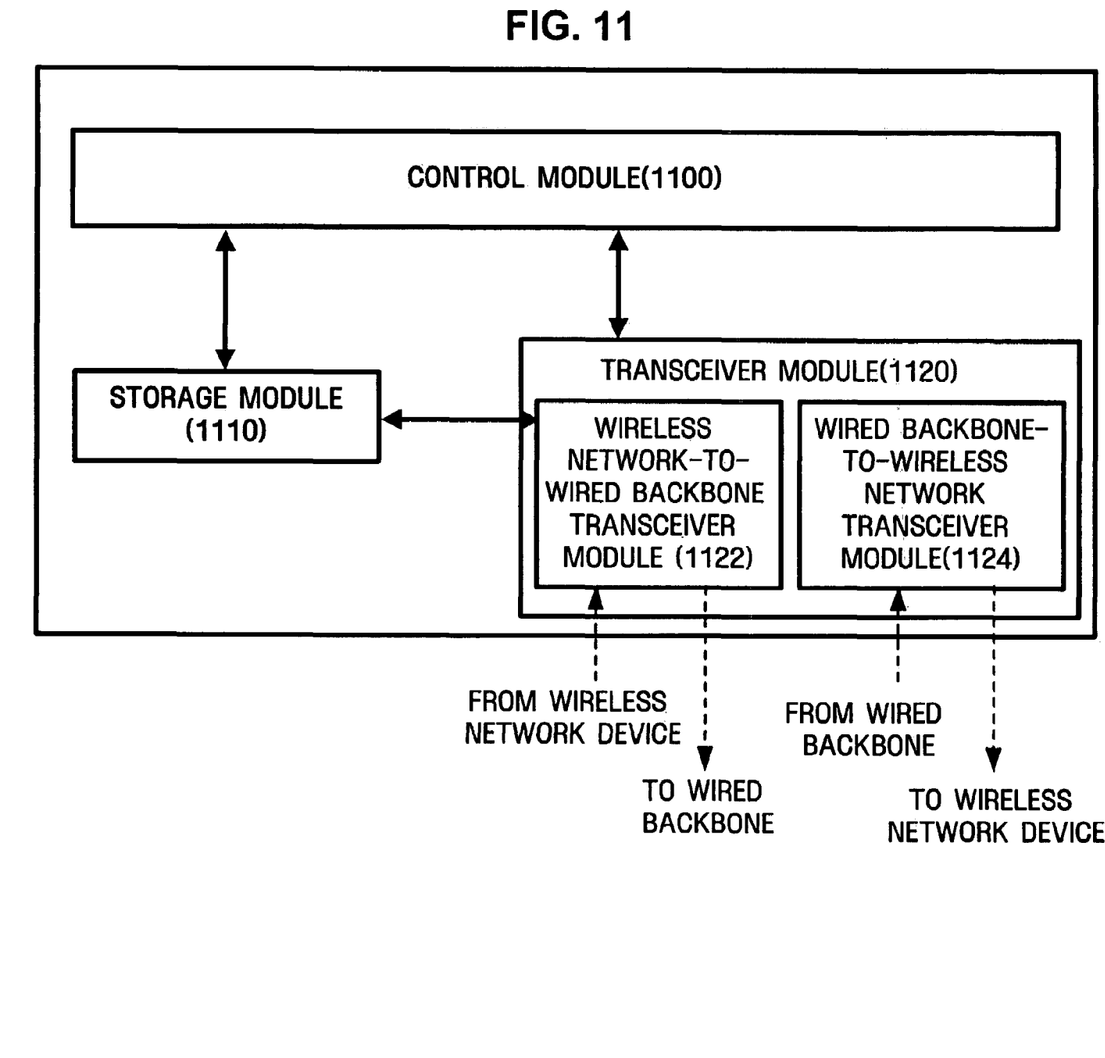
FIG. 11 is a block diagram of a wired/wireless connecting device according to an exemplary embodiment of the present invention.

FIG. 11 is a block diagram of a wired/wireless connecting device according to an exemplary embodiment of the present invention.

Referring to FIG. 11, the wired/wireless connecting device largely includes a control module 1100, a storage module 1110, and a transceiver module 1120.

The transceiver module 1120 is divided into a transceiver module 1122 receiving a frame from a coordinator-based wireless network and sending the frame to a wired backbone network and a transceiver module 1124 receiving a frame from the wired backbone network and sending the frame to the coordinator-based wireless network.

The control module 1100 converts a frame having a format supported by the coordinator-based wireless network and received from the transceiver module 1120 into a frame in a format supported by the wired backbone network and vice versa.

The storage module 1110 stores frames received from the transceiver module 1120 or transformed by the control module 1100. It is necessary to temporarily store frames in order to adjust the size of a frame that can be transmitted at a time on the coordinator-based wireless network or the backbone network when the two networks support different frame sizes and to convert between frame formats.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation. The methods according to the exemplary embodiments of the present invention as described above, can also be embodied as computer readable program recorded in a recording medium.

A method and apparatus for communication between coordinator-based wireless networks connected together through a backbone network according to the present invention enables communication between different coordinator-based wireless networks, thereby widening areas of application of communications supported by the coordinator-based wireless network.

In addition, the present invention allows use of MAC addresses as physical addresses of a source device and a destination device, thereby preventing transmission of incorrect frame caused by duplication of devices' physical addresses assigned by a PNC.

What is claimed is:

1. A method for communication between coordinator-based wireless networks connected together through a backbone network, the method comprising:

acquiring a physical address of a destination network device belonging to a first coordinator-based wireless network;

generating a frame containing the physical address of the destination network device; and transmitting the frame to a connecting device connecting a second coordinator-based wireless network containing a source network device with the backbone network, wherein the acquiring of the physical address of the destination network device comprises:

transmitting a physical address request frame requesting the physical address of the destination network device;

receiving a physical address response frame containing the physical address of the destination network device from the connecting device in response to the physical address request frame; and extracting the physical address of the destination network device from the physical address response frame, wherein at least the first coordinator-based wireless network is a network in which a randomly selected device within the first coordinator-based wireless network acts as a coordinator that assigns channel time to other devices within the first coordinator-based wireless network for data transmission.

2. The method of claim 1, wherein the frame containing the physical address comprises a frame body including data to be transmitted, and a header including information about the data to be transmitted and information about a physical address type and physical addresses of the source network device and the destination network device.

3. The method of claim 1, wherein the frame containing the physical address comprises a frame body including data to be transmitted and physical addresses of the source network device and the destination network device, and a header including information about the data to be transmitted and information about a physical address type.

4. A method for communication between coordinator-based wireless networks connected together through a backbone network, the method comprising:

receiving a physical address request frame from a connecting device connecting the backbone network with a coordinator-based wireless network to which a destination network device belongs;

transmitting a physical address response frame to the connecting device in response to the physical address request frame; and receiving a frame including the physical address of the destination network device after transmitting the physical address response frame to the connecting device, wherein the coordinator-based wireless network is a network in which a randomly selected device within the coordinator-based wireless network acts as a coordinator that assigns channel time to other devices within the coordinator-based wireless network for data transmission.

5. The method of claim 4, wherein the frame including the physical address comprises a frame body including data to be transmitted, and a header including information about the data to be transmitted and information about a physical address type and physical addresses of a source network device and the destination network device.

6. The method of claim 4, wherein the frame including the physical address comprises a frame body including data to be transmitted and physical addresses of the source network device and the destination network device, and a header including information about the data to be transmitted and information about a physical address type.

7. A network device comprising:

a control module which generates a physical address request frame requesting a physical address of a destination network device connected to a different coordinator-based wireless network than a coordinator-based wireless network to which a source network device belongs, extracts the physical address of the destination network device from a physical address response frame received in response to the physical address request frame, and generates a frame including the physical address of the destination network device;

a transceiver module which transmits the physical address request frame generated by the control module or the frame including the physical address of the destination network device and receives the physical address response frame in response to the physical address request frame; and a storage module which stores the frames generated by the control module or provided by the transceiver module, wherein the coordinator-based wireless network to which the source network device belongs is a network in which a randomly selected device within the coordinator-based wireless network to which the source network device belongs acts as a coordinator that assigns channel time to other devices within the coordinator-based wireless network to which the source network device belongs for data transmission.

8. The device of claim 7, wherein the frame including the physical address of the destination network device comprises a frame body including data to be transmitted, and a header including information about the data to be transmitted and a physical address type and physical addresses of the source network device and the destination network device.

9. The device of claim 7, wherein the frame including the physical address comprises a frame body including data to be transmitted and physical addresses of the source network device and the destination network device, and a header including information about the data to be transmitted and information about a physical address type.

10. A network device comprising:
- a control module which generates a physical address response frame including a physical address of a destination network device in response to a physical address request frame received from a connecting device connecting a backbone network with a coordinator-based wireless network to which the destination network device belongs;
- a transceiver module which transmits the physical address response frame generated by the control module and receives the physical address request frame or the frame including the physical address of the destination network device; and
- a storage module which stores the frames generated by the control module or provided by the transceiver module,
- wherein the coordinator-based wireless network is a network in which a randomly selected device within the coordinator-based wireless network acts as a coordinator that assigns channel time to other devices within the coordinator-based wireless network for data transmission.

11. The device of claim 10, wherein the frame including the physical address of the destination network device comprises a frame body including data to be transmitted, and a header including information about the data to be transmitted and a physical address type and physical addresses of the source network device and the destination network device.

12. The device of claim 10, wherein the frame including the physical address comprises a frame body including data to be transmitted and physical addresses of the source network device and the destination network device, and a header including information about the data to be transmitted and information about a physical address type.

13. A recording medium having a computer readable program recorded therein for causing a computer to implement a method for communication between coordinator-based wireless networks connected together through a backbone network, the method comprising:
- acquiring a physical address of a destination network device belonging to a first coordinator-based wireless network;
- generating a frame containing the physical address of the destination network device; and
- transmitting the frame to a connecting device connecting a second coordinator-based wireless network containing a source network device with the backbone network,
- wherein the acquiring of the physical address of the destination network device comprises:
  - transmitting a physical address request frame requesting the physical address of the destination network device;
  - receiving a physical address response frame containing the physical address of the destination network device from the connecting device in response to the physical address request frame; and
  - extracting the physical address of the destination network device from the physical address response frames,
- wherein at least the first coordinator-based wireless network is a network in which a randomly selected device within the first coordinator-based wireless network acts as a coordinator that assigns channel time to other devices within the first coordinator-based wireless network for data transmission.

14. A recording medium having a computer readable program recorded therein for causing a computer to implement a method for communication between coordinator-based wireless networks connected together through a backbone network, the method comprising:
- receiving a physical address request frame from a connecting device connecting the backbone network with a coordinator-based wireless network to which a destination network device belongs;
- transmitting a physical address response frame to the connecting device in response to the physical address request frame; and
- receiving a frame including the physical address of the destination network device after transmitting the physical address response frame to the connecting devices,
- wherein the coordinator-based wireless network is a network in which a randomly selected device within the coordinator-based wireless network acts as a coordinator that assigns channel time to other devices within the coordinator-based wireless network for data transmission.

* * * * *